(12) United States Patent
Phillips

(10) Patent No.: US 12,149,112 B2
(45) Date of Patent: Nov. 19, 2024

(54) ENERGY MANAGEMENT FOR EVSE

(71) Applicant: Schneider Electric USA, Inc., Andover, MA (US)

(72) Inventor: Timothy B. Phillips, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 262 days.

(21) Appl. No.: 17/899,603

(22) Filed: Aug. 30, 2022

(65) Prior Publication Data
US 2024/0072561 A1    Feb. 29, 2024

(51) Int. Cl.
*H02H 7/00* (2006.01)
*B60L 53/30* (2019.01)
*B60L 53/68* (2019.01)
*H02J 7/00* (2006.01)

(52) U.S. Cl.
CPC .......... *H02J 7/00712* (2020.01); *B60L 53/30* (2019.02); *B60L 53/68* (2019.02); *H02J 7/0047* (2013.01); *H02J 7/007* (2013.01); *H02J 2310/48* (2020.01)

(58) Field of Classification Search
None
See application file for complete search history.

(56) References Cited

U.S. PATENT DOCUMENTS

| 9,889,760 B2 | 2/2018 | Jefferies et al. |
| 10,486,539 B2 | 11/2019 | Corbeil et al. |
| 2009/0082980 A1 | 3/2009 | Thurmond et al. |
| 2010/0292877 A1* | 11/2010 | Lee .......................... B60L 50/66 180/68.5 |
| 2013/0141040 A1* | 6/2013 | DeBoer ................... B60L 53/62 320/109 |
| 2016/0075246 A1* | 3/2016 | Liptak ..................... B60L 58/10 320/109 |
| 2016/0280092 A1* | 9/2016 | Jefferies .................. H02J 7/007 |
| 2017/0279269 A1 | 9/2017 | Durth et al. |
| 2018/0109047 A1* | 4/2018 | Hoang ................. G01R 22/066 |
| 2018/0126860 A1* | 5/2018 | Weicker ................ B60L 53/305 |
| 2019/0257891 A1 | 8/2019 | Kim et al. |

(Continued)

OTHER PUBLICATIONS

Thermolec, "Electric Vehicle Energy Management System", 5 pages, https://dccelectric.com; website last visited Aug. 30, 2022.

(Continued)

*Primary Examiner* — Stephen W Jackson
(74) *Attorney, Agent, or Firm* — Locke Lord LLP

(57) ABSTRACT

A virtual branch circuit system for an electric vehicle supply equipment (EVSE) can include a current sensor disposed in operative communication with circuit wires of a plurality of circuits of a virtual branch. The current sensor can be disposed between a plurality of circuit breakers and a plurality of respective loads. At least one of the plurality of loads is not an EVSE. The current sensor can be configured to sense a virtual branch total current comprising total current of all non-EVSE loads on the virtual branch. The system can include a control module operatively connected to the EVSE and configured to control a maximum EVSE current based on the virtual branch total current to maintain the virtual branch total current at or under a maximum branch current threshold.

20 Claims, 3 Drawing Sheets

(56) References Cited

U.S. PATENT DOCUMENTS

2020/0086748 A1    3/2020    Bolger et al.

OTHER PUBLICATIONS

International Search Report, prepared by Examiner Taina Matos, of the United States Patent and Trademark Office, as ISA, mailed Nov. 20, 2023, in corresponding International Patent Application PCT/US23/31427.
Aspnes et al. On-Line Load Balancing with Applications to Machine Scheduling and Virtual Circuit Routing. IBM Almaden Research Center. Dec. 31, 1993. [Oct.. 17, 2023]. Retrieved from internet; <https://dl.acm.org/doi/pdf/10.1145/167088.167248> pp. 623-631.
Wei et al. VersiCharge-SG—Smart Grid Capable Electric Vehicle Supply Equipment (EVSE) for Residential Applications. U.S. Department of Energy National Energy Technology Lab. Sep. 30, 2015. [Oct. 17, 2023]. Retrieved from internet; <https://www.osti.gov/servlets/purl/1234438>.

\* cited by examiner

ENERGY MANAGEMENT FOR EVSE

FIELD

This disclosure relates to energy management for electric vehicle supply equipment (EVSE).

BACKGROUND

NFPA 70, the National Electrical Code (NEC), requires a service size calculation to be performed on all new (or significantly revised) single family residences in order to establish an appropriate service entrance size for the residence. Newer single family residences are likely to get a service size of at least 200 A regardless of the result of the calculation, but older homes frequently have service sizes of 100 A or 125 A. When the owner of such a home wishes to have an Electric Vehicle Supply Equipment (EVSE) installed to charge an electric vehicle at home, often they are told that they must first have an expensive (e.g., hundreds or thousands of dollars) service entrance upgrade to create sufficient service size to allow it. This is because the minimum level 2 EVSE needs a 40 A circuit and NEC rules call for an EVSE to be considered a 100% demand factor load.

Such conventional methods and systems have generally been considered satisfactory for their intended purpose. However, there is still a need in the art for improved energy management for EVSE. The present disclosure provides a solution for this need.

SUMMARY

A virtual branch circuit system for an electric vehicle supply equipment (EVSE) can include a current sensor disposed in operative communication with circuit wires of a plurality of circuits of a virtual branch. The current sensor can be disposed between a plurality of circuit breakers and a plurality of respective loads. At least one of the plurality of loads is not an EVSE. The current sensor can be configured to sense a virtual branch total current comprising total current of all non-EVSE loads on the virtual branch. The system can include a control module operatively connected to the EVSE to configured to control a maximum EVSE current based on the virtual branch total current to maintain the virtual branch total current at or under a maximum branch current threshold.

In certain embodiments, the system can include the EVSE. In certain embodiments, the system does not include the EVSE. In certain embodiments, the control module can be wirelessly connected to the EVSE.

In certain embodiments, the control module can be configured to subtract the virtual branch total current from the maximum branch current threshold, and output a remaining current value to the EVSE. In certain embodiments, the EVSE can be configured to limit a current demand of a vehicle charger (e.g., on board a vehicle) to the remaining current value.

In certain embodiments, the plurality of respective loads include one or more appliances that are not controlled by the control module. In certain embodiments, the one or more appliances can include an electric clothing dryer. In certain embodiments, the one or more appliances can include a water heater. Any suitable appliance (e.g., intermittently used) can be included in the virtual branch. The system can be National Electric Code (NEC) compliant.

In accordance with at least one aspect of this disclosure, an EVSE control module can be configured to be operatively connected to a current sensor to receive a sensor reading indicative of a virtual branch total current of all non-EVSE loads on a virtual branch. The EVSE control module can also be configured to be operatively connected to an EVSE that is part of the virtual branch to control a maximum EVSE current based on the virtual branch total current to maintain the virtual branch total current under a maximum branch current threshold.

The EVSE control module can be configured to be wirelessly connected to the EVSE. The EVSE control module can be configured to subtract the virtual branch total current from the maximum branch current threshold, and output a remaining current value to the EVSE. The EVSE control module can be configured to allow installation of an EVSE without a service upgrade and still comply with the NEC.

In accordance with at least one aspect of this disclosure, a non-transitory computer readable medium can include computer executable instructions configured to cause a computer to execute a method. The method can include receiving a current sensor signal indicative of a virtual branch total current between a plurality of circuit breakers and a plurality of respective loads of a virtual branch, comparing the virtual branch total current to a maximum branch current threshold for the virtual branch, determining a remaining current value based on the comparing of the virtual branch total current to the maximum branch current threshold for the virtual branch, and outputting the remaining current value to an electric vehicle supply equipment (EVSE) to cause the EVSE to limit a charge current of an electric vehicle to maintain virtual total branch current under the maximum branch current threshold. Determining the remaining current value can include subtracting the virtual branch total current from the maximum branch current threshold.

In accordance with at least one aspect of this disclosure, a method for installing an EVSE without upgrading a service amount to a building can include installing an EVSE circuit in a panel, the EVSE circuit having at least one EVSE. In certain embodiments, installing the EVSE circuit alone can cause the panel to exceed the service amount based on a 100% demand factor of the EVSE circuit. The method can also include installing a virtual branch circuit system that reduces the demand factor of the EVSE circuit to cause the panel to no longer exceed the service amount.

Installing a virtual branch circuit system can include installing a current sensor around wires of a plurality of circuits to define a virtual branch and to read a virtual branch total current. Installing the virtual branch circuit system can include installing a control module configured to receive signals from the current sensor and to communicate with the EVSE to provide the EVSE with a remaining current value.

Installing the current sensor can include installing a current transformer (CT) on each phase of each circuit of the plurality of circuits. Installing the virtual branch circuit system can include defining the virtual branch to include intermittently used appliances to maximize the possible remaining current over time for the EVSE.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make

DETAILED DESCRIPTION

Figure 1:
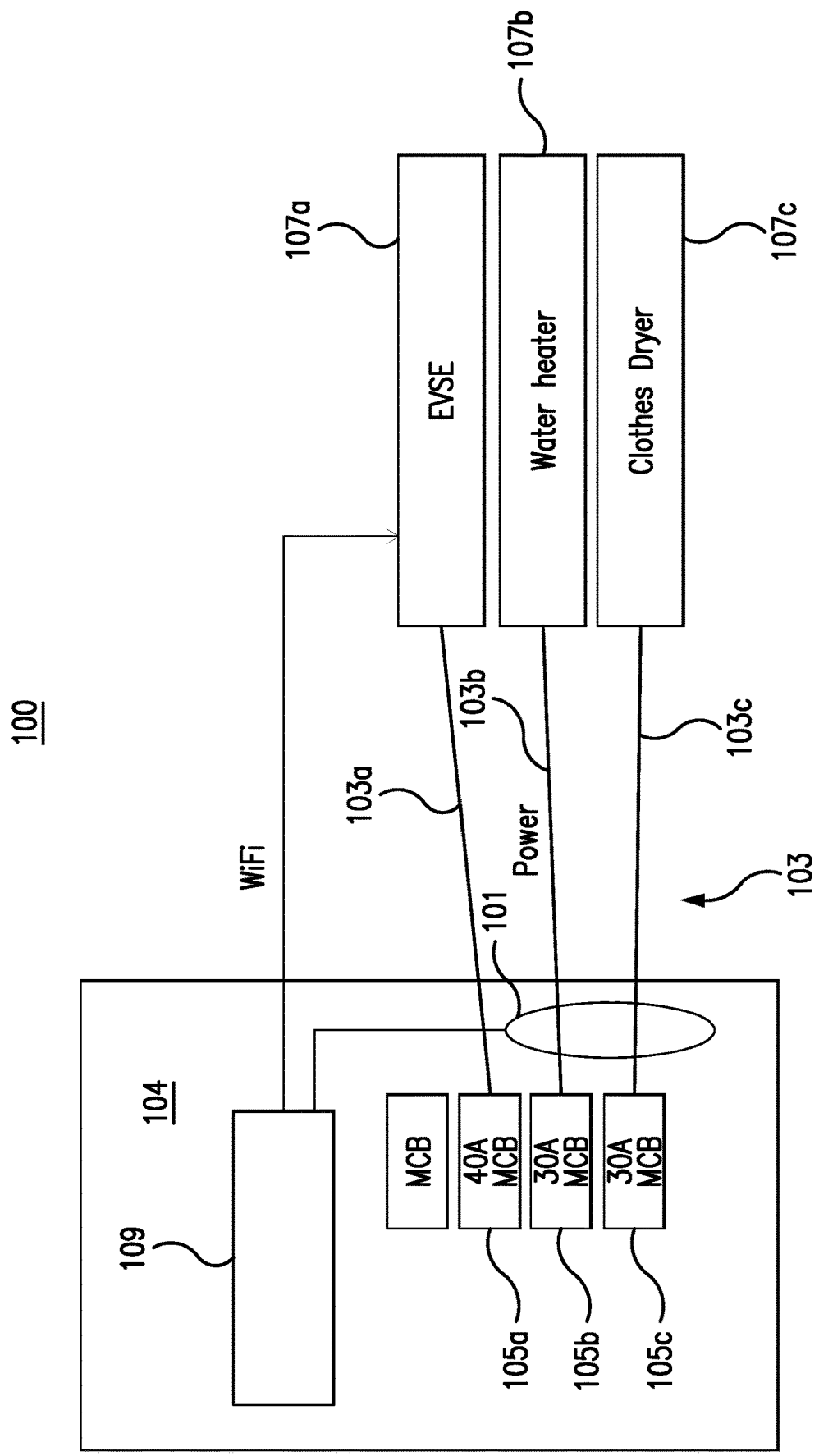
FIG. 1 is a schematic diagram of an embodiments of a system in accordance with this disclosure.
Figure 2:
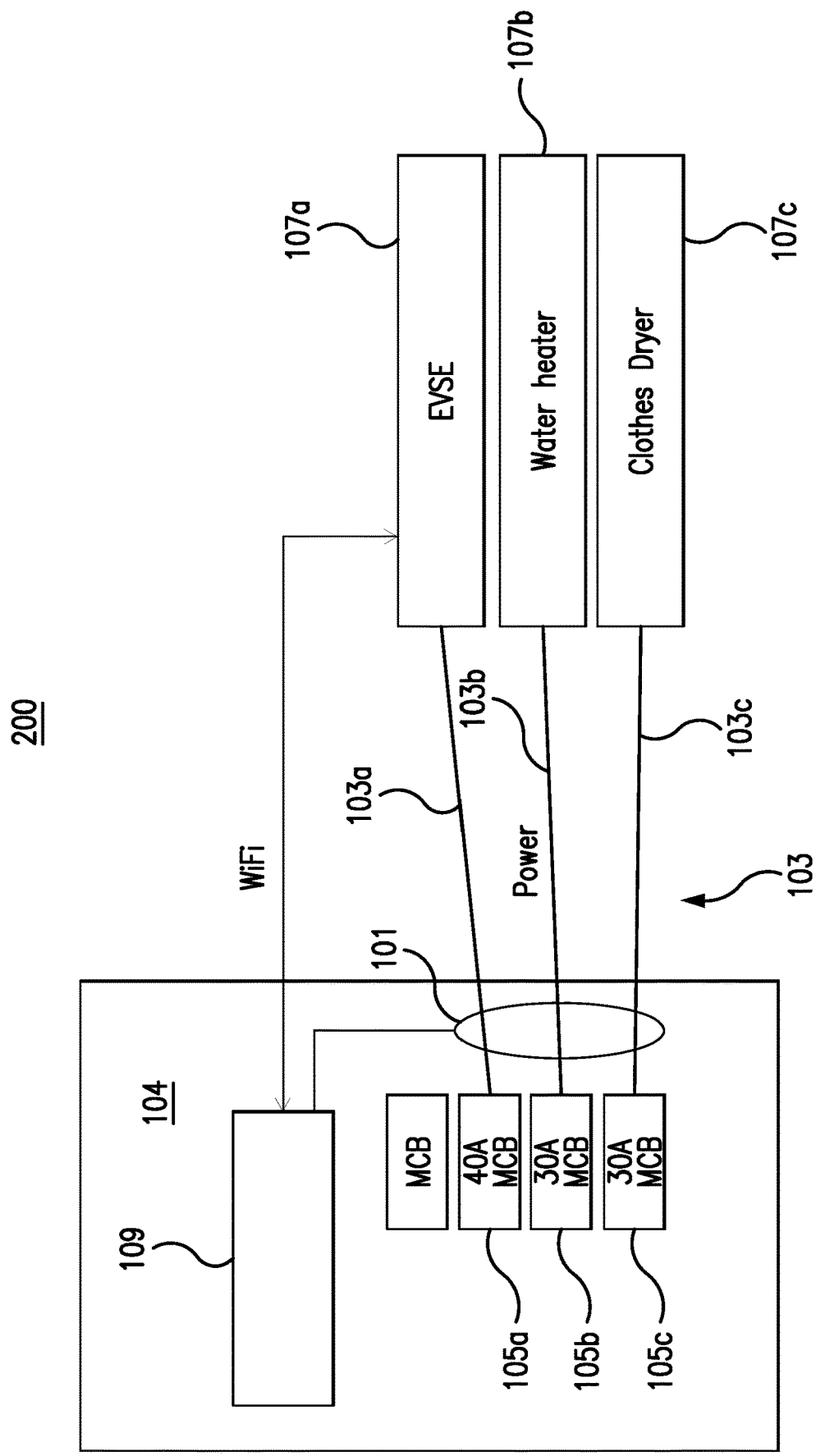
FIG. 2 is a schematic diagram of another embodiment of a system in accordance with this disclosure.
Figure 3:
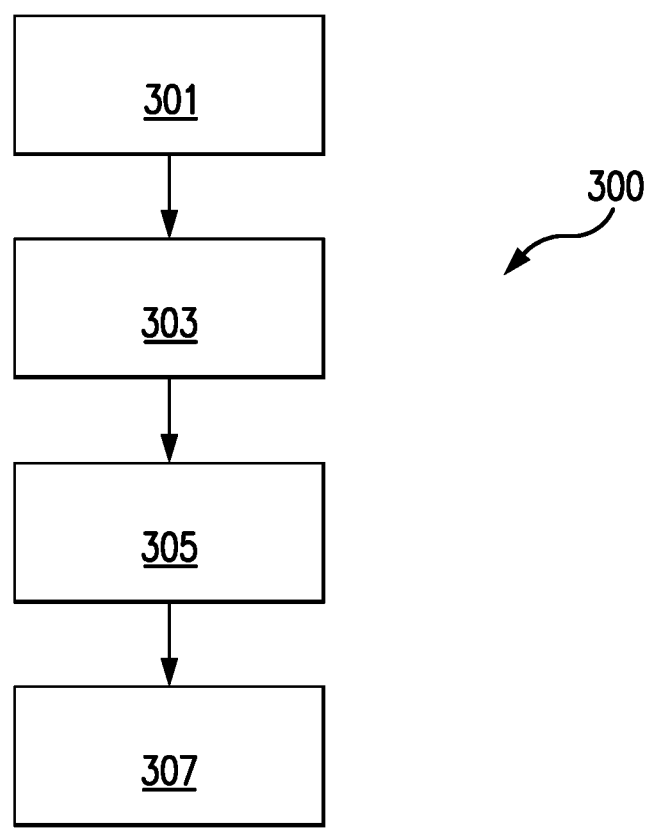
FIG. 3 is a flow chart of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

Referring to FIG. 1, a virtual branch circuit system 100 for an electric vehicle supply equipment (EVSE) can include a current sensor 101 disposed in operative communication with circuit wires 103b, 103c of a plurality of circuits (e.g., a water heater circuit and a clothes dryer circuit) of a virtual branch 103. The virtual branch 103 can include an EVSE 107a connected to a circuit breaker 105a via one or more wires 103a. The virtual branch 103 can be a plurality of circuits of the panel 104 that is less than a total plurality of circuits in the panel 104, for example (e.g., including an EVSE 107a and at least one or more other non-EVSE loads).

The current sensor 101 can be disposed between a plurality of circuit breakers 105b, 105c and a plurality of respective loads 107b, 107c. In the depicted embodiment, at least one of the plurality of loads 107b, 107c is not an EVSE, but rather are household appliances such as the water heater 107b, the clothes dryer 107c, and so on. More generally, the non-EVSE loads can include lighting, HVAC systems, pool equipment (e.g., which is frequently off at night), cooking ovens, electrical outlets, and/or any other suitable loads. The current sensor 101 can be configured to sense a virtual branch total current comprising total current of all non-EVSE loads on the virtual branch 103.

The system 100 can include a control module 109 operatively connected to the EVSE 107a and configured to control a maximum EVSE current based on the virtual branch total current to maintain the virtual branch total current at or under a maximum branch current threshold (e.g., a service limit of a small building, e.g., 100 Amps). In certain embodiments, e.g., as shown in the system 200 of FIG. 2, the plurality of respective loads 107a, 107b, 107c in the virtual branch can include an EVSE 107a. In certain embodiments, the current sensor 101 senses total current including the EVSE 107a (which may require feedback from the EVSE 107a to know what amount of current is being pulled only by the EVSE).

In certain embodiments, the system 100 can include the EVSE 107a. In certain embodiments, the system does not include the EVSE 107a (e.g., the system can be just the control module 109 and the sensor 101). In certain embodiments, the control module 101 can be wirelessly connected to the EVSE 107a, e.g., as shown, for one directional or bidirectional communication with the EVSE.

In certain embodiments, the control module 109 can be configured to subtract the virtual branch total current from the maximum branch current threshold, and output a remaining current value to the EVSE 107a. In embodiments where the wires for the EVSE 107a are included by the current sensor 101, the control module 109 can be configured to subtract a known EVSE current (e.g., provided by the EVSE 107a to the controller 109) from the total current as well to arrive at the remaining current value (e.g., so as to not cause control oscillation as disclosed below).

In certain embodiments, the EVSE 107a can be configured to limit a current demand of a vehicle charger (e.g., on board a vehicle) to the remaining current value. In such embodiments, the amount of current pulled by the electric car can never cause the virtual branch to exceed its own limit (e.g., which can be the current limit of the non-EVSE loads when accounting for demand factor). This can mean that the proper power calculation for the panel does not get changed when adding the EVSE as it only runs up to allotted current for certain preexisting non-EVSE loads (e.g., large appliances that are not run frequently).

In certain embodiments, the plurality of respective loads 107a, 107b, 107c include one or more appliances 107b, 107c that are not controlled by the control module 109. In certain embodiments, the one or more appliances 107b, 107c can include an electric clothing dryer 107c. In certain embodiments, the one or more appliances 107b, 107c can include a water heater 107b. Any suitable appliance (e.g., intermittently used) or number of appliances can be included in the virtual branch 103. The system 100 can be National Electric Code (NEC) compliant even if an EVSE has been added to an existing panel that is near or at the limit of service.

In accordance with at least one aspect of this disclosure, an EVSE control module 109 can be configured to be operatively connected to a current sensor 101 to receive a sensor reading indicative of a virtual branch total current of all non-EVSE loads on a virtual branch 103. The EVSE control module 109 can also be configured to be operatively connected to an EVSE 107a that is part of the virtual branch 103 to control a maximum EVSE current based on the virtual branch total current to maintain the virtual branch total current under a maximum branch current threshold. The EVSE control module 109 can include any suitable embodiment of a control module disclosed herein (e.g., as described above). The EVSE control module 109 can be configured to allow installation of an EVSE 107a without a service upgrade and still comply with the NEC. This can allow legal retrofit in older homes and businesses with a small service, for example.

In accordance with at least one aspect of this disclosure, referring to FIG. 3, a non-transitory computer readable medium can include computer executable instructions configured to cause a computer to execute a method. The method 300 can include receiving (e.g., at block 301) a current sensor signal indicative of a virtual branch total current (e.g., of only all non-EVSE loads) between a plurality of circuit breakers and a plurality of respective loads of a virtual branch, comparing (e.g., at block 303) the virtual branch total current to a maximum branch current threshold for the virtual branch, determining (e.g., at block 305) a remaining current value based on the comparing of the virtual branch total current to the maximum branch current threshold for the virtual branch, and outputting (e.g., at block 307) the remaining current value to an EVSE to cause the EVSE to limit a charge current of an electric vehicle to maintain virtual total branch current under the maximum branch current threshold. Determining the remaining current value can include subtracting the virtual branch total current from the maximum branch current threshold, for example.

In accordance with at least one aspect of this disclosure, a method for installing an EVSE (e.g., EVSE 107a) without upgrading a service amount to a building (e.g., an existing home) can include installing an EVSE circuit in a panel, the EVSE circuit having at least one EVSE. In certain embodiments, installing the EVSE circuit alone can cause the panel to exceed the service amount based on a 100% demand factor of the EVSE circuit. The method can also include installing a virtual branch circuit system (e.g., system 100 as disclosed herein) that reduces the demand factor of the EVSE circuit to cause the panel to no longer exceed the service amount.

Installing a virtual branch circuit system can include installing a current sensor around wires of a plurality of circuits to define a virtual branch and to read a virtual branch total current. Installing the virtual branch circuit system can include installing a control module configured to receive signals from the current sensor and to communicate with the EVSE to provide the EVSE with a remaining current value.

Installing the current sensor can include installing a current transformer (CT) on each phase of each circuit of the plurality of circuits. Installing the virtual branch circuit system can include defining the virtual branch to include intermittently used appliances to maximize the possible remaining current over time for the EVSE.

As appreciated by those having ordinary skill in the art, the NEC does not allow total current monitoring of an entire panel to be used to change a demand factor of an EVSE. However, embodiments of this disclosure can operated under existing NEC, reducing the demand factor of EVSE to actual current drawn.

Embodiments can have any number of loads in a virtual circuit, but certain embodiments can include large enough loads such that the EVSE can be operated at maximum vehicle current draw (e.g., on a 60 amp breaker) when the other non-EVSE loads are not in operation.

The control module can see current value pulled through the whole virtual branch, and limit the branch to maximum branch current. The control module can talk to the EVSE and provide it with a maximum current value that it is allowed to use, for example. The EVSE then can communicate with a charger on board a car, and limit the power draw to the maximum available current.

Embodiments can include EVSE energy management systems with virtual branch circuit control. Embodiments can include virtual branch circuit energy management for an EVSE to allow addition of an EVSE to a residential electrical panel while avoiding the need for an electrical service entrance upgrade. Embodiments can provide a virtual branch circuit energy management system which can allow a homeowner to avoid an expensive service upgrade while fully meeting NEC service entrance size rules.

NEC already allows an energy management system to control the power at a branch circuit level where say multiple EVSEs might be connected to a branch circuit that could not support all of them operating at maximum load. Such an energy management system will limit the power to all or some of the EVSEs in order for the total power to remain below the set threshold for the whole branch. But normal residential homes don't need multiple chargers and instead would benefit from taking advantage of the times when little else is consuming power in the home, to maximize the power the EVSE is allowed to use. Embodiments include a virtual branch circuit where the EVSE plus one or more other branch circuits are grouped together for energy management purposes. The NEC does not allow total load monitoring of the load center to change any demand factor of the load center.

As an example, one could analyze a home which has a service entrance size of 125 A. One could assume this example home has the following electrical loads: general lighting and appliance (5,100 VA), HVAC (3,600 VA), water heater (4,500 VA), refrigerator (1,400 VA), dishwasher (1,030 VA), disposal (690 VA), range hood (400 VA), microwave (1,200 VA), clothes dryer (5,000 VA), range (5000 VA). After NEC rules for demand factors of the above, the calculation comes to 24,615 VA which equates to 103 A. So with a 125 A service this house has 22 A of "spare capacity" until the service limit is reached. If it is desired to add a level 2 EVSE (100% utilization according to existing NEC rules) at 7,680 VA, the total increases to 32,295 VA which is 135 A. The home would traditionally need a service entrance upgrade to add the level 2 EVSE.

Now, one can analyze the same home that has a service entrance size of 125 A. One could add a virtual branch circuit energy management system (e.g., system 100) to this home which can include or consist of the EVSE (32 A, 7,680 VA), the water heater (4,500 VA), and the clothes dryer (5,000 VA), e.g., as shown. Without these loads the service size calculation results in 68 A which gives 57 A of available current to be put under control of the energy management system in the virtual branch circuit. The branch wires for the EVSE, water heater, and clothes dryer can all be clamped by CTs and the total consumption limit can be set to 57 A. This means that, if the water heater and clothes dryer are both running at the same time, 9,500 VA of power (39.6 A) will be consumed in the virtual branch circuit by those devices. The controller (e.g., control module 109 for example) can tell the EVSE that it is allowed a maximum of 17.4 A (57 minus 39.6), e.g., via the WiFi link. In the case where only the clothes dryer is running, the EVSE can be told that it can take a maximum of 36.2 A which means it can charge a car at its full capability of 32 A. In such a case, this home could even have a larger 10 kW EVSE.

In embodiments where the EVSE circuit is included by the current sensor, then the control module would need to know not just the virtual branch current value, but also the actual EVSE current value too. Then the control module would know the correct total value that the EVSE can be allowed. But if the EVSE wires are left out from the CTs, then the control module would only need to know the non-EVSE virtual branch current value to calculate what the EVSE can be allowed. Below is an example with all wires grouped and no knowledge of just the EVSE draw. Assume a water heater (4,500 VA) and a dryer (5,000 VA) are grouped together in the virtual branch circuit with an EVSE (7,680 VA) and the home is the same as in the above example, which has 57 A of available current for this virtual branch. If the water heater is off, the dryer is on and using 20.8 A, and the EVSE is off, the controller will measure 20.8 A and inform the EVSE that it can use 36.2 A. If the EVSE is plugged into the car and turns on at 32 A, the controller will now measure 52.8 A and tells the EVSE it can now have 4.2 A, so the EVSE will limit the current draw to 4.2 A. The controller now measures 25 A and tells the EVSE it can now have 32 A. This cycle can continue.

To avoid this bounce/oscillation, the controller can have feedback from the EVSE to know the actual EVSE usage at any given moment. In the same example, for example, if the water heater is off, the dryer is on and using 20.8 A, and the EVSE is off, the controller will measure 20.8 A and since it knows the EVSE is using nothing, it informs the EVSE that it can use 36.2 A. If the EVSE is plugged into a car and turns on at 32 A, the controller will now measure 52.8 A but also knows that the EVSE is using 32 A so it still tells the EVSE it can use 36.2 A. If the water heater comes on and uses 18.8 A, the controller now measures 71.6 A but knows the EVSE is using 32 A, so tells the EVSE it must drop to 17.4 A. The EVSE then lowers its use to 17.4 A. The controller now measures 57 A and still tells the EVSE it can use 17.4 A. This can provide stability but requires either another set of CTs (to measure current draw to EVSE) or information coming from the EVSE to the controller.

Instead, if the EVSE wires are left out of the virtual branch CTs, the desired results can be achieved, and there is no bounce/oscillation, or feedback/additional measurement required. For example, assume the water heater is off, the dryer is on and using 20.8 A, and the EVSE is off. The controller will measure 20.8 A and informs the EVSE that it can use 36.2 A. The EVSE is then plugged into the car and turns on at 32 A. The controller will still measure 20.8 A so continues to inform the EVSE it can use 36.2 A. If the water heater comes on and uses 18.8 A, the controller now measures 39.6 A so tells the EVSE it must now only use 17.4 A. The EVSE lowers its use to 17.4 A. The controller still measures 57 A and still tells the EVSE it can still only use 17.4 A. This can provide stability and does not require any extra CTs or information coming from the EVSE.

Embodiments can include any suitable computer hardware and/or software module(s) to perform any suitable function (e.g., as disclosed herein). For example, the control module 109 can include any suitable computer hardware and/or software module(s).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A virtual branch circuit system for an electric vehicle supply equipment (EVSE), comprising:
   a current sensor disposed in operative communication with circuit wires of a plurality of circuits of a virtual branch, the current sensor disposed between a plurality of circuit breakers and a plurality of respective loads, wherein at least one of the plurality of loads is not an EVSE, wherein the current sensor is configured to sense a virtual branch total current comprising a total current of all non-EVSE loads on the virtual branch; and
   a control module operatively connected to the EVSE and configured to control a maximum EVSE current based on the virtual branch total current to maintain the virtual branch total current at or under a maximum branch current threshold.

2. The system of claim 1, further including the EVSE.

3. The system of claim 2, wherein the control module is wirelessly connected to the EVSE.

4. The system of claim 3, wherein the control module is configured to subtract the virtual branch total current from the maximum branch current threshold, and output a remaining current value to the EVSE.

5. The system of claim 4, wherein the EVSE is configured to limit a current demand of a vehicle charger to the remaining current value.

6. The system of claim 5, wherein the plurality of respective loads include one or more appliances that are not controlled by the control module.

7. The system of claim 6, wherein the one or more appliances include an electric clothing dryer.

8. The system of claim 7, wherein the one or more appliances include a water heater.

9. The system of claim 8, wherein the system is National Electric Code (NEC) compliant.

10. An electric vehicle supply equipment (EVSE) control module configured to be operatively connected to a current sensor and to receive a sensor reading indicative of a virtual branch total current of all non-EVSE loads on a virtual branch, wherein the EVSE control module is also configured to be operatively connected to an EVSE that is part of the virtual branch to control a maximum EVSE current based on the virtual branch total current to maintain the virtual branch total current under a maximum branch current threshold.

11. The EVSE control module of claim 10, wherein the EVSE control module is configured to be wirelessly connected to the EVSE.

12. The EVSE control module of claim 11, wherein the EVSE control module is configured to subtract the virtual branch total current from the maximum branch current threshold, and output a remaining current value to the EVSE.

13. The EVSE control module of claim 12, wherein the EVSE control module is configured to allow installation of an EVSE without a service upgrade and still comply with the National Electric Code (NEC).

14. A non-transitory computer readable medium, comprising computer executable instructions configured to cause a computer to execute a method, the method comprising:
   receiving a current sensor signal indicative of a virtual branch total current between a plurality of circuit breakers and a plurality of respective loads of a virtual branch;
   comparing the virtual branch total current to a maximum branch current threshold for the virtual branch;
   determining a remaining current value based on the comparing of the virtual branch total current to the maximum branch current threshold for the virtual branch; and
   outputting the remaining current value to an EVSE to cause the EVSE to limit a charge current of an electric vehicle to maintain virtual total branch current under the maximum branch current threshold.

15. The non-transitory computer readable medium of claim 14, wherein determining the remaining current value includes subtracting the virtual branch total current from the maximum branch current threshold.

16. A method for installing an electric vehicle supply equipment (EVSE) without upgrading a service amount to a building, comprising:
   installing an EVSE circuit in a panel, the EVSE circuit having at least one EVSE, wherein installing the EVSE circuit alone would cause the panel to exceed the service amount based on a 100% demand factor of the EVSE circuit; and
   installing a virtual branch circuit system that reduces the demand factor of the EVSE circuit to cause the panel to no longer exceed the service amount.

17. The method of claim 16, wherein installing a virtual branch circuit system includes installing a current sensor around wires of a plurality of circuits to define a virtual branch and to read a virtual branch total current.

18. The method of claim 17, wherein installing the virtual branch circuit system includes installing a control module configured to receive signals from the current sensor and to communicate with the EVSE to provide the EVSE with a remaining current value.

19. The method of claim 18, wherein installing the current sensor includes installing a current transformer (CT) on each phase of each circuit of the plurality of circuits.

20. The method of claim 18, wherein installing the virtual branch circuit system includes defining the virtual branch to include intermittently used appliances to maximize the possible remaining current over time for the EVSE.

* * * * *